DEVICE TO PRODUCE STEAM FOR MOBILE AND STATIONARY TOYS

Original Filed Nov. 13, 1959

INVENTOR:
Eberhard Seuthe
By:
Arthur O. Klein
Attorney

DEVICE TO PRODUCE STEAM FOR MOBILE AND STATIONARY TOYS

Original Filed Nov. 13, 1959 Sheet 2 of 2

INVENTOR:
Eberhard Seuthe
By:
Arthur O. Klein
Attorney

United States Patent Office

Re. 26,563
Reissued Apr. 15, 1969

26,563

DEVICE TO PRODUCE STEAM FOR MOBILE AND STATIONARY TOYS

Eberhard Seuthe, Uhingen, Wurttemberg, Germany

Original No. 3,160,980, dated Dec. 15, 1964, Ser. No. 852,707, Nov. 13, 1959. Application for reissue Dec. 14, 1966, Ser. No. 604,525
Int. Cl. A63h *33/28, 17/00, 19/00*
U.S. Cl. 46—9 9 Claims

Matter enclosed in heavy brackets [ ] appears in the original patent but forms no part of this reissue specification; matter printed in italics indicates the additions made by reissue.

*ABSTRACT OF THE DISCLOSURE*

*A device for artificially producing smoke or visible vapor in a toy which comprises means for storing a smoke or vapor producing liquid which has a capillary tube mounted therein and which extends to the ambient atmosphere. The capillary tube is adapted to draw smoke producing liquid from the storing means into the capillary tube. A heating wire extending along at least a portion of the storing means and or the capillary tube and being connected to an electric power source. The heating wire is adapted to heat the smoke producing liquid in the storing means and thereby cause the liquid to exit from the capillary tube in the form of visible smoke or vapor.*

The invention relates to a device for producing steam for mobile and stationary toys, especially for toy-locomotives.

The steam is produced by electrically heating a liquid. The device of this invention comprises a capillary tube supported inside the storage tank for the steam producing liquid in such a manner that the lower extremity of each capillary tube is dipping into the smoke or visible steam producing liquid and that the heat producer (heating wire spiral) extends to the top extremity of the capillary tube.

The heating wire spiral is rolled up onto a heat-resistant small tube of current-insulating material, wherein the capillary tube is slidably supported. Instead of this arrangement the heat producer (heating wire spiral) may also be directly spiralled onto the capillary.

Preferably part of the housing of the device of this invention forms at the same time part of the funnel of the toy. In an alternate embodiment the housing may be put into the funnel of the toy-locomotive. In the latter instant, it is convenient if according to the invention the housing by means of a flange arranged at its extremity supports itself and centers on the funnel part of the toy so that a heat insulating collar space of air is formed between the housing of the device of this invention and the funnel part of the toy-locomotive. Finally, in still another embodiment of the invention the heating wire spiral is bedded into a casing of current insulating material and the two filament current wire connections of the heating wire spiral carry the sleeve and the heating wire spiral. The lower filament current connection which extends through the bottom of the bowl-shaped housing is sealed at the bottom so that the liquid does not leak out.

The novel features which are considered as characteristic for the invention are set forth in particular in the appended claims. The invention itself, however, both as to its construction and its method of operation, together with additional objects and advantages thereof, will be best understood from the following description when read in connection with the accompanying drawings in which:

Figure 1:
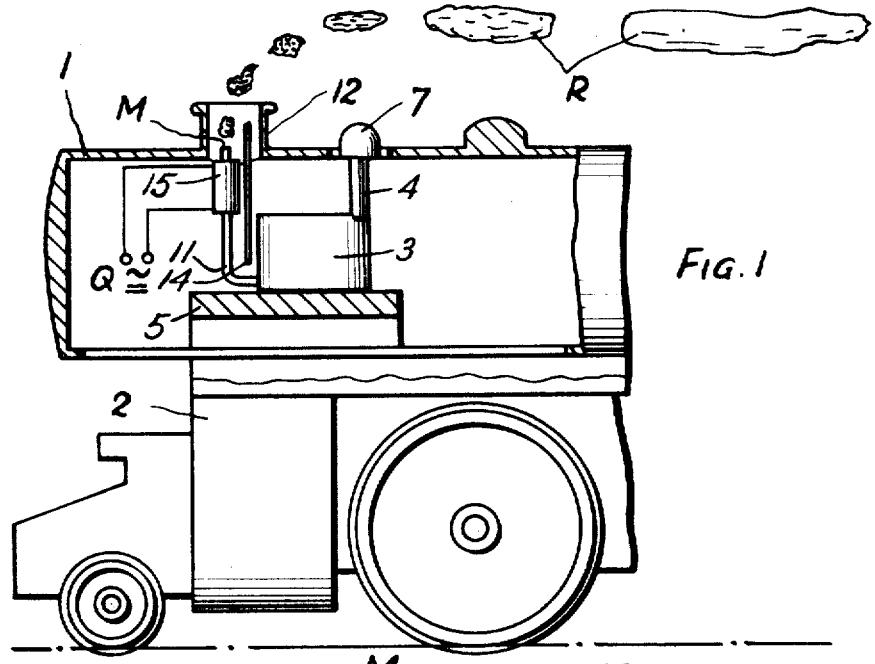
FIG. 1 shows in side-view a device of this invention built into the front part of a toy-locomotive.
Figure 2:
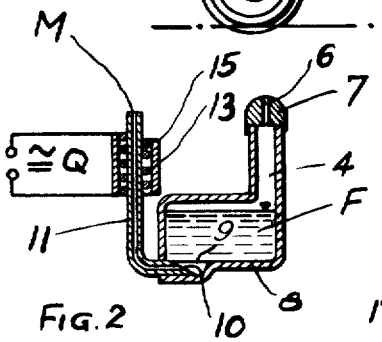
FIG. 2 is a longitudinal sectional view of the device of FIG. 1.

Referring now to the drawings in which similar components are designated by the same numerals, the device of FIGS. 1 and 2 is located in the boiler 1 situated on the chassis 2 of the toy locomotive. The support 5 of the boiler is carrying the storage tank 3 containing the liquid to be evaporated. The storage tank 3 has the refill tube 4 through which the tank 3 may be refilled with a visible steam vapor or smoke producing liquid. The refill tube 4 is provided with a cap 7 which has a vent hole 6. The bottom 8 of the tank 3 has a groove 9 which leads into the mouth 10 of the capillary tube 11, which has a degree of capillarity that transports liquids, such as for instance disclosed in my copending application Ser. No. 852,608, filed Nov. 13, 1959, *and now abandoned*, into the sphere of the heating effect of the heating wire spiral 13. The upper extremity of this capillary tube 11 leads into the stack 12 of the toy-locomotive. The heating wire spiral 13 surrounds the capillary tube 11 and is supported in the concentric casing 15 made of ceramic material. The insulating shield 14 prevents the heat of the heating wire spiral 13 to excessively heat the liquid in the tank 3.

When the circuit of the heating wire spiral 13 is closed, the heat produced by the same causes the liquid F which is creeping upwards, due to the capillary actions and degree of capillarity in tube 11, to evaporate when it reaches a point in the tube 11 opposite the spiral 13. The smoke or visible vapor R then leaves the capillary tube 11 which is made of steel, through the opening M.

Figure 3:
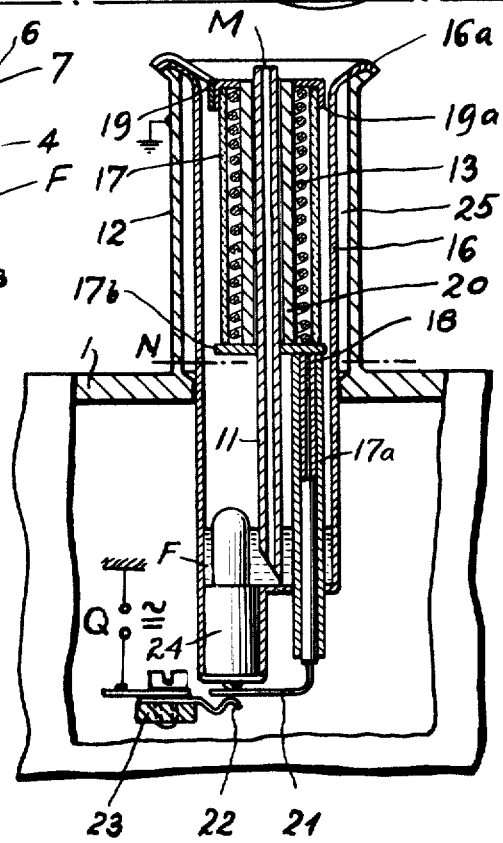
FIGS. 3 to 5 are three longitudinal sectional views of three embodiments of this invention.

The embodiment of FIG. 3 mainly consists of the capillary tube 11 which has a lower extremity that extends into the liquid F. In this embodiment, the heating wire spiral 13 surrounds the upper portion of the capillary tube 11 which runs coaxially with the metal housing 16 of the device. The housing 16 is supported and centered by means of an integral flange 16a on the funnel 12 of a toy-locomotive. The capillary tube 11 is guidingly supported by a small thermally insulated tube 17 of dielectric material which embraces the heating wire spiral 13 of the heating producer. The sleeve 17 in turn is supported by two filament current wire connections 18, 19. The small tube 17 is made of ceramic material (of insulating cement or the like) having the aforementioned properties. Inside the wire spiral 13 extends coaxially the sleeve 20, of dielectric but thermally conductive material, from the heating wire connection 19 down to the contact plate 17b. The sleeves 17 and 20 are dielectric and packed with respect to the bowlshaped housing 16. Whereas sleeve 20 consists of thermally conductive material to insure good heat transfer to the capillary tube 11, sleeve 17 consists of heat insulating material, such as ceramic cement. The lower wire connection 18 extends downwardly through a ceramic tube 17a and ends at the contact plate 21. The contact plate 21 is urged by the contact plate-spring 22 against the pole of the bulb socket 24. The bulb in the bulb socket 24 is secured therein in a liquid-tight manner so that the liquid F does not leak out through the socket 24. The plate spring 22 is supported by the bridge 23 which is preferably made of synthetic resin. The tube 17a and the disc 17b are also preferably made of heat-proof ceramic insulating material.

The liquid-mark for the liquid F in the housing 16 of the device is designated with the line N. It is, however possible for the device to properly function even if the housing 16 is erroneously filled up to the flange 16a. Thus the energizing current that produces the heat and thereby evaporates the liquid F in the upper part of the capillary tube 11 flows from the electric current source Q via the contact plate-spring 22, the contact plate 21, the filament current wire connection 18, the heating wire spiral 13, the cap 19a, the heating wire connection 19, the flange 16a, the mass in the form of the boiler 1 which is usually made of zinc die-cast, back to the current source Q; the space 25 between the funnel 12 and the sleeve 16 serves to insulate and thereby protect the funnel 12 of the toy-locomotive. This is necessary since the housing can become very hot in the area of the spiral 13 which would then transmit the heat to the funnel 12 which frequently consists of unhardened synthetic resin and is therefore sensitive to heat. The capillary tube 11 is preferably made of steel and can be easily exchanged by means of tweezers, if it should become clogged or is otherwise rendered unusable.

Figure 4:
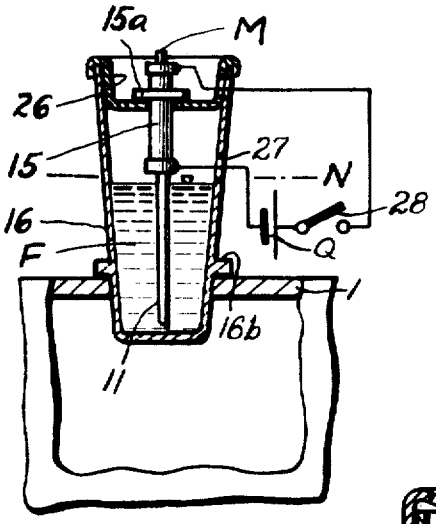

The embodiment illustrated in FIG. 4 comprises a casing 15 which has a collar 15a by means of which the casing 15 is supported on the insertion piece 26 which is fitted on the upper border of the housing 16. The housing 16 of this embodiment has the overflow opening 27. A switch 28 in the energizing circuit of the devices serves to turn the device on or off. The device may be inserted into an opening of the boiler 1, of a toy-locomotive and is supported therein by a collar 16b.

Figure 5:
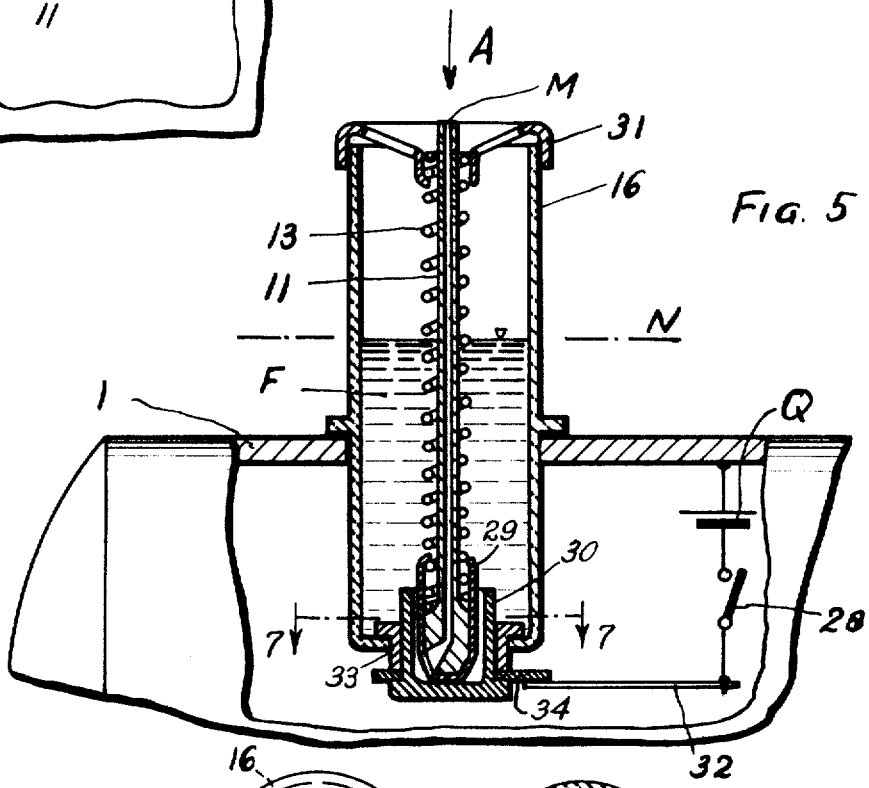
Figure 6:
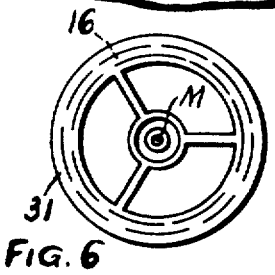
FIG. 6 is a plan view in the direction of arrow A in FIG. 5.
Figure 7:
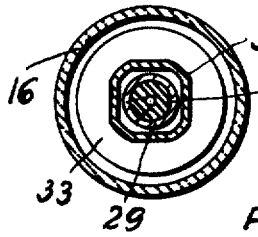
FIG. 7 is a cross sectional view along line 7—7 FIG. 5.

The embodiment illustrated in FIGS. 5 to 7 has a heating wire spiral 13, spiralled and cemented onto the capillary tube 11. The capillary tube 11 is preferably manufactured out of ceramic material and has a tightly fitted cap 29 at its lower end which extends into the metal bush 30. A spoke ring 31 is fitted over the upper end of spiral 13 and serves to support the tube 11 in an upright coaxial position inside the housing 16. The metal bush 30 is in turn held in position by the insulating ring 33. The afore recited structural members 31, 13, 11 and 29 can be easily interchanged with new parts in the event any one or all of them become unusable. The heating wire spiral 13 is located in the following electric circuit:

Power source Q, boiler 1, housing 16, spoke ring 31, heating wire spiral 13, metal bushes 29, 30, cable shoe 34, cable 32, switch 28 and back to power source Q.

Examples of liquids used for producing the smoke or the like are disclosed and described in my co-pending patent application, Serial No. 852,608, filed November 13, 1959, and now abandoned.

The device of the instant invention, when filled with the appropriate liquid and heated, emits intermittently smoke, visible vapor or the like as illustrated with clouds R in FIG. 1 of the drawing, with an accompanying puffing noise.

[Although the present invention has been described in conjunction with preferred embodiments, it is to be understood that modifications and variations may be resorted to without departing from the spirit and scope of this invention, as those skilled in the art will readily understand. Such modifications and variations are considered to be within the purview and scope of the invention and appended claims.]

I claim:

1. In a toy, a device for artificially producing smoke, visible vapor or the like, comprising in combination, an electric power source, storing means for storing a smoke producing liquid in said toy, at least one capillary tube extending from said storing means to the outside of said toy, a heating wire extending along a vertical portion of said capillary tube, said [spiral] wire being electrically connected to said electric power source.

2. The device as set forth in claim 1, wherein said capillary tube extends through a smoke stack of said toy and wherein said [spiral] heating wire embraces said capillary tube adjacent to said smoke stack.

3. The device as set forth in claim 1, wherein said storing means comprise a tubular housing, a collar integral with said tubular shape resting on said toy, said tubular housing being a simulated smoke stack of said toy.

4. The device as set forth in claim 1 including two coaxial tubes coextensive with each other and said [spiral] wire, said tubes being operatively supported in said toy and said [spiral] wire extending therebetween, said tubes consisting of dielectric material, the tube having the larger diameter consisting of thermally insulating material and the tube having the smaller diameter consisting of thermally conductive material.

5. In a toy, a device for artificially producing smoke or the like, comprising in combination, smoke-producing liquid storage means, an electric power source, at least one capillary tube having a first vertical portion thereof in open communication with the exterior of said toy and having a second portion extending into said smoke-producing liquid storage means, a heating wire coextending with at least a portion of said first vertical portion of the capillary tube, said heating wire being electrically connected to said electric power source.

6. In a toy having a smoke stack, a device for artificially producing smoke, visible vapor or the like, comprising in combination, an electric power source, storing means for storing a smoke producing liquid in said toy, at least one capillary tube extending through said smoke stack of said toy from said storing means to the outside of said toy, a spiral heating wire embracing at least a vertical portion of said capillary tube adjacent to said smoke stack, said storing means including a tubular housing which extends through said smoke stack in spaced coaxial relationship thereto, said housing having a collar at its upper end which rests on the upper end of said smoke stack for pendant support thereon, said housing in turn supporting said capillary tube, said storing means and said wire.

7. In a toy, a device for artificially producing smoke, visible vapor or the like, comprising in combination, an electric power source, storing means for storing a smoke producing liquid in said toy, at least one capillary tube extending from said storing means to the outside of said toy, a spiral heating wire embracing at least a vertical portion of said capillary tube, said spiral heating wire being electrically connected to said electric power source and a tube of dielectric material coextensively supported in said toy with said spiral wire, said capillary tube and said spiral wire axially extending through said tube of dielectric material.

8. In a toy having a smoke stack, a device for artificially producing smoke, visible vapor or the like, comprising in combination, an electric power source, storing means for storing a smoke producing liquid mounted in said toy, at least one capillary tube in communication with the ambient atmosphere, a portion of said capillary tube extending into said storing means and being adapted to draw said smoke producing liquid therefrom into said capillary tube by capillary action, and heating wire means operatively connected to said electric power source and coextending with at least a portion of said capillary tube, whereby when said heating wire means have sufficiently heated said capillary tube, the smoke producing liquid therein exits in the form of visible clouds intermittently from said capillary tube to the ambient atmosphere.

9. In a toy having a smoke stack, a device for artificially producing smoke, visible vapor or the like, comprising in combination, an electric power source, storing means for storing a smoke producing liquid mounted in said toy, at least one capillary tube of heat conducting material mounted in said toy in communication with the ambient atmosphere, said tube having at least one interior portion of sufficiently small interior diameter to draw said smoke producing liquid therethrough by means of capillary action, said interior portion extending into said smoke producing liquid, and heating wire means of capillary action, said interior portion extending into said smoke producing liquid, and heating wire means operatively connected to said electric power source and co-extending with at least a portion of said capillary tube, whereby when said heating wire means have sufficiently heated said capillary tube the smoke producing liquid in said interior portion of said capillary tube exits in the form of visible clouds intermittently from said capillary tube.

References Cited

The following references, cited by the Examiner, are of record in the patented file of this patent or the original patent.

UNITED STATES PATENTS

| | | | |
|---|---|---|---|
| 1,939,252 | 12/1933 | Colosimo | 219—362 |
| 2,461,664 | 2/1949 | Smith. | |
| 2,507,464 | 5/1950 | Andrade | 431—208 |

FOREIGN PATENTS

| | | |
|---|---|---|
| 530,009 | 12/1921 | France. |
| 137,153 | 4/1934 | Austria. |
| 496,788 | 12/1938 | Great Britain. |
| 533,637 | 2/1941 | Great Britain. |

LOUIS G. MANCENE, *Primary Examiner.*

C. R. WENTZEL, *Assistant Examiner.*

U.S. Cl. X.R.

46—217; 219—271